United States Patent
Drupsteen

[19]

[11] Patent Number: 6,003,776

[45] Date of Patent: *Dec. 21, 1999

[54] MULTIPLE TICKETS ON SMART CARDS

[75] Inventor: Michel Marco Paul Drupsteen, NA Alkmaar, Netherlands

[73] Assignee: Koninklijke KPN N.V., AE Groningen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/928,261

[22] Filed: Sep. 12, 1997

[30] Foreign Application Priority Data

Sep. 13, 1996 [EP] European Pat. Off. ............. 96202562

[51] Int. Cl.$^6$ .................................................. G06K 19/06
[52] U.S. Cl. ............................................. 235/492; 235/380
[58] Field of Search ................................ 235/492, 382, 235/487, 441, 449, 493, 380, 383, 385; 902/26

[56] References Cited

U.S. PATENT DOCUMENTS

| | | | |
|---|---|---|---|
| 3,946,206 | 3/1976 | Darjany | 235/493 X |
| 3,947,660 | 3/1976 | Saito | 235/379 |
| 4,058,839 | 11/1977 | Darjany | 235/493 X |
| 4,108,365 | 8/1978 | Hughes | 235/419 |
| 4,211,919 | 7/1980 | Ugon | 235/487 |
| 5,224,173 | 6/1993 | Kuhns et al. | 382/2 |
| 5,473,144 | 12/1995 | Mathurin, Jr. | 235/380 |
| 5,553,155 | 9/1996 | Kuhns et al. | 382/115 |
| 5,604,343 | 2/1997 | Curry et al. | 235/492 |
| 5,679,945 | 10/1997 | Renner et al. | 235/492 |
| 5,760,385 | 6/1998 | Curry et al. | 235/492 |

FOREIGN PATENT DOCUMENTS

| | | |
|---|---|---|
| 0 658 862 | 6/1995 | European Pat. Off. . |
| 0 713 198 A2 | 5/1996 | European Pat. Off. . |
| 2726385 | 5/1996 | France . |
| 3432557 A1 | 3/1986 | Germany . |
| 9301902 | 6/1995 | Netherlands . |
| 1572051 | 7/1980 | United Kingdom . |
| 2267626 | 12/1993 | United Kingdom . |
| WO 89/09459 | 10/1989 | WIPO . |
| WO 95/22125 | 8/1995 | WIPO . |

*Primary Examiner*—Michael G Lee
*Attorney, Agent, or Firm*—Oblon, Spivak, McClelland, Maier & Neustadt, P.C.

[57] ABSTRACT

An efficient way of storing multiple tickets on smart cards. A ticket comprises a validation count field for registering by way of a validation count the number of times the ticket may be used. Preferably, the validation count is lowered each time the ticket is validated, the validation being effected by writing validation data in the validation field of the ticket. In this way a single ticket can thus be used as a multiple ticket, thus saving memory space. The validation count is also effective in limiting the number of tickets validated, thus limiting the extent of possible fraud.

14 Claims, 5 Drawing Sheets

| Entitlement Field 21 | Validation Field 22 | Verification Field 23 | Price Field 24 | Sequence Number Field 25 | Validation Count Field 26 |

MULTIPLE TICKETS ON SMART CARDS

BACKGROUND OF THE INVENTION

The present invention relates to a method of using tickets on smart cards, and to smart cards in which tickets are stored. In particular, the present invention relates to the secure storing, validating and verifying of multiple tickets on smart cards, multiple tickets being tickets which may be used more than once. Such multiple tickets may e.g. be bus or train tickets which may be used for more than one trip, or theatre tickets which can be used for more than one performance or more than one person.

There is a growing need for storing tickets on smart cards as the use of smart cards and the number of applications for which they are used increases. Present day smart cards, however, have a limited memory size. The storing of a plurality of tickets on a single card is therefore only feasible if an efficient way of storing those tickets is employed. Especially multiple tickets, which give the cardholder multiple access to e.g. a service, take up a relatively large amount of memory space. Several schemes of using tickets have been proposed in the Prior Art, but none of these appears to provide an efficient way of storing multiple tickets.

Dutch patent application NL 93 01902 discloses a method of obtaining a right to a service by means of a smart card (IC card). In this Prior Art method, the card serves both as a payment means and as a registration means. That is, the card is used to store proof of payment of the service paid for, thus replacing paper tickets. The use of multiple tickets, i.e. tickets which may be used more than once, is also mentioned in said patent application.

In the method of the above-mentioned patent application, a ticket is stored on a card by registering on the card an access code, optionally in combination with a card identification code. At the terminal of e.g. a theatre the access code and (optionally) the identification code are checked, whereupon the access code is erased from the card. The way multiple tickets are implemented is not disclosed. The above-mentioned patent application therefore does not provide a specific method for securely storing tickets on smart cards, and certainly not for multiple tickets.

European Patent Application EP 0 658 862 discloses a method and system for employing multi-functional smart cards by means of a communication system. This prior art method and system allow e.g. airline tickets to be stored on the smart cards. The specific manner in which the tickets are stored is however not disclosed.

U.S. patent application Ser. No. 08/908,716, filed on Aug. 8, 1997 assigned to the present assignee, and entitled "Tickets stored in smart cards" describes the use of tickets on smart cards, in particular the use of validation and verification fields to issue, validate and verify tickets at different locations and at different points in time respectively. The above-mentioned U.S. patent application, which is incorporated by reference herein, does not describe the use of multiple tickets.

The Prior Art therefore does not provide an efficient way of storing multiple tickets in smart cards.

SUMMARY OF THE INVENTION

It is an object of the present invention to overcome the above-mentioned and other disadvantages of the prior art and to provide a smart card which allows tickets to be efficiently stored. It is another object of the present invention to provide a smart card which allows a limitation to be placed on the number of tickets to be issued and used. It is a further object of the present invention to provide a method of registering multiple tickets on smart cards.

Accordingly, the present invention provides a smart card comprising an integrated circuit having a processor and a memory, the memory comprising tickets, a ticket comprising an entitlement field for storing data relating to the entitlement of the ticket, and a validation field for storing data relating to the validity of the ticket, the smart card being characterized in that a ticket further comprises a validation count field for registering the number of times the ticket may be validated.

By providing a validation count field, it is possible to validate the same ticket more than once while strictly controlling the number of times the ticket may be used. As a multiple ticket of this type requires hardly more memory space than a regular ticket, a very efficient memory use is achieved.

The present invention also provides a method of registering tickets on a smart card comprising a memory, the method comprising the steps of: creating a ticket in the memory, the ticket comprising at least one field, issuing the ticket by storing in the field data identifying a right to be conveyed by the ticket, validating the ticket by storing in a validation field data relating to the validity of the ticket, the method being characterized in that the step of issuing the ticket comprises storing in a validation count field a validation count representing the number of times the ticket may be validated, and in that the step of validating the ticket comprises adjusting the validation count stored in the validation count field, said adjusting as well as the step of validating the ticket being inhibited if the validation count has a predetermined value.

BRIEF DESCRIPTION OF THE DRAWINGS

The invention will further be explained with reference to the accompanying drawings, in which.

EXEMPLARY EMBODIMENTS

Figure 1:
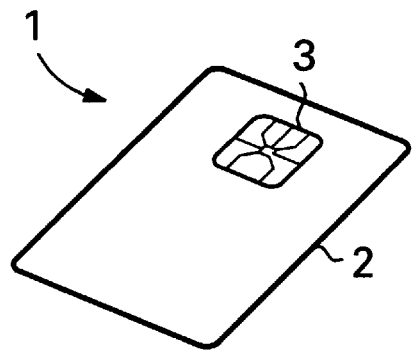
FIG. 1 schematically shows a smart card as may be used in the method of the present invention, FIG. 2 schematically shows the integrated circuit of the smart card of FIG. 1, FIG. 3 schematically shows the structure of a ticket as stored in a smart card.

The smart card or IC card 1 shown schematically and by way of example in FIG. 1 comprises a substrate 2, in which an integrated circuit is embedded. The integrated circuit is provided with contacts 3 for contacting a card reader or the like. It should be noted that the present invention can also be applied in the case of so-called contactless smart cards.

Figure 2:
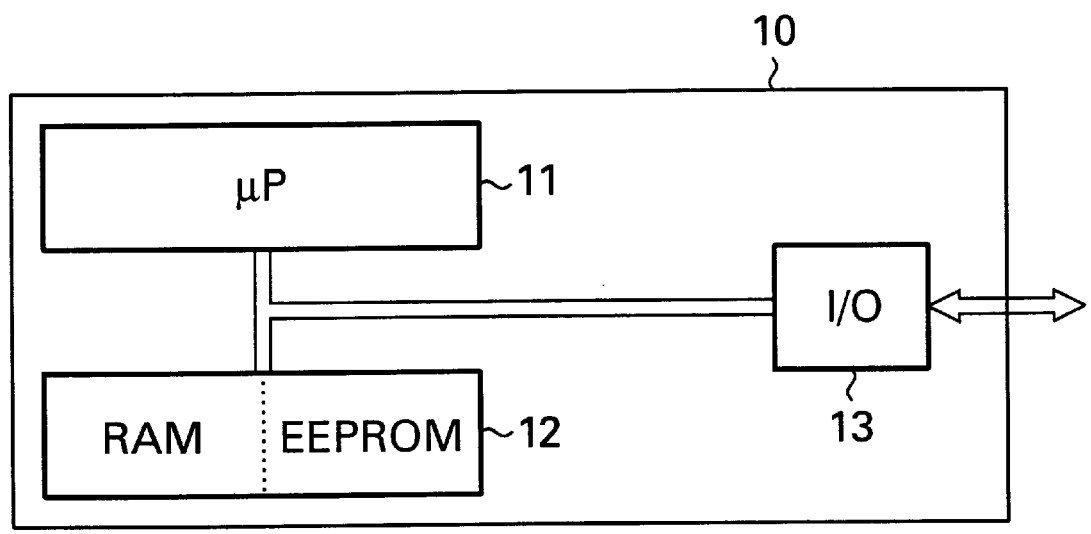

The integrated circuit 10 shown schematically and by way of example in FIG. 2 comprises a processor 11, a memory 12 and an input/output circuit 13. The memory may comprise a volatile (RAM) memory part for temporarily storing data and a non-volatile (ROM) memory part for permanently or semi-permanently storing data. The latter part is preferably an EEPROM type memory. The data stored in the non-volatile part may contain both programming data (instructions, programs) and payment data, i.e. data relating to monetary transactions. It will be understood that a separate memory (not shown) may be provided to store the instruction set of the processor 11.

A preferred embodiment of a ticket according to the present invention is schematically shown in FIG. 3. The ticket 20 comprises several fields, i.e. an entitlement field 21, a validation field 22, a verification field 23, a price field 24, a sequence number field 25, and a validation count field 26. In practice, a ticket may comprise additional fields which are not shown in FIG. 3. Also, a ticket according to the present invention may comprise less fields, or more fields of the same type, e.g. two verification fields. For the purpose of the present invention, the entitlement field 21, the validation field 22 and the validation count field 26 are primarily of importance.

The entitlement field 21 contains the description of the ticket which may include e.g. the identity of the ticket issuer, the scope of validity (e.g. an expiration date, the maximum length of a trip), the number of persons the ticket is valid for, and/or the starting point and destination of a trip.

The validation field 22 is reserved for information which may be added later to the ticket, such as a starting time and/or date of validity.

The verification field 23 is reserved for information which may be added during the use of the ticket, such as the date, the time, and a terminal identification. This information provides a "marking" of the ticket which indicates that a check of the ticket with respect to the validity has taken place. A code identifying a particular means of transportation (e.g. a train code) may also be included in the information stored in the verification field.

The price field 24 may contain the price of the ticket. In the case of a multiple ticket, this may be the price of the total ticket (multiple use) or the price of a single use of the ticket.

The sequence number field 25 comprises the sequence number of the ticket 20. This sequence number may be used for verification and limitation purposes, as will later be explained below.

The validation count field 26 comprises a validation count, which is used to provide multiple use of the ticket 20. That is, the ticket 20 may be used a number of times, that number being represented by the validation count. Preferably, the validation count is decreased upon each validation of the ticket, a count value zero representing a ticket which is used up, i.e. which cannot be validated another time. In this case, the count value is equal to the number of times the ticket can (still) be used, assuming that the count is decreased during each validation. Alternatively, the count may be decreased or increased until it reaches some predetermined value (null value), which need not equal zero. In principle said predetermined value may be different for each ticket. However, having a fixed value indicating a used-up ticket eliminates the need for storing the null value, thus saving memory space.

If the null value equals zero, and if the validation count is initially set to one, the multiple ticket 20 is essentially reduced to a single ticket. This allows the multiple ticket structure of FIG. 3 to be used for all types of tickets, both multiple and single, thus simplifying the smart card hardware and software.

It will be understood that the fields of the ticket 20 may be stored in the memory 12 of the card 1, as shown in FIGS. 1 and 2.

Figure 4:
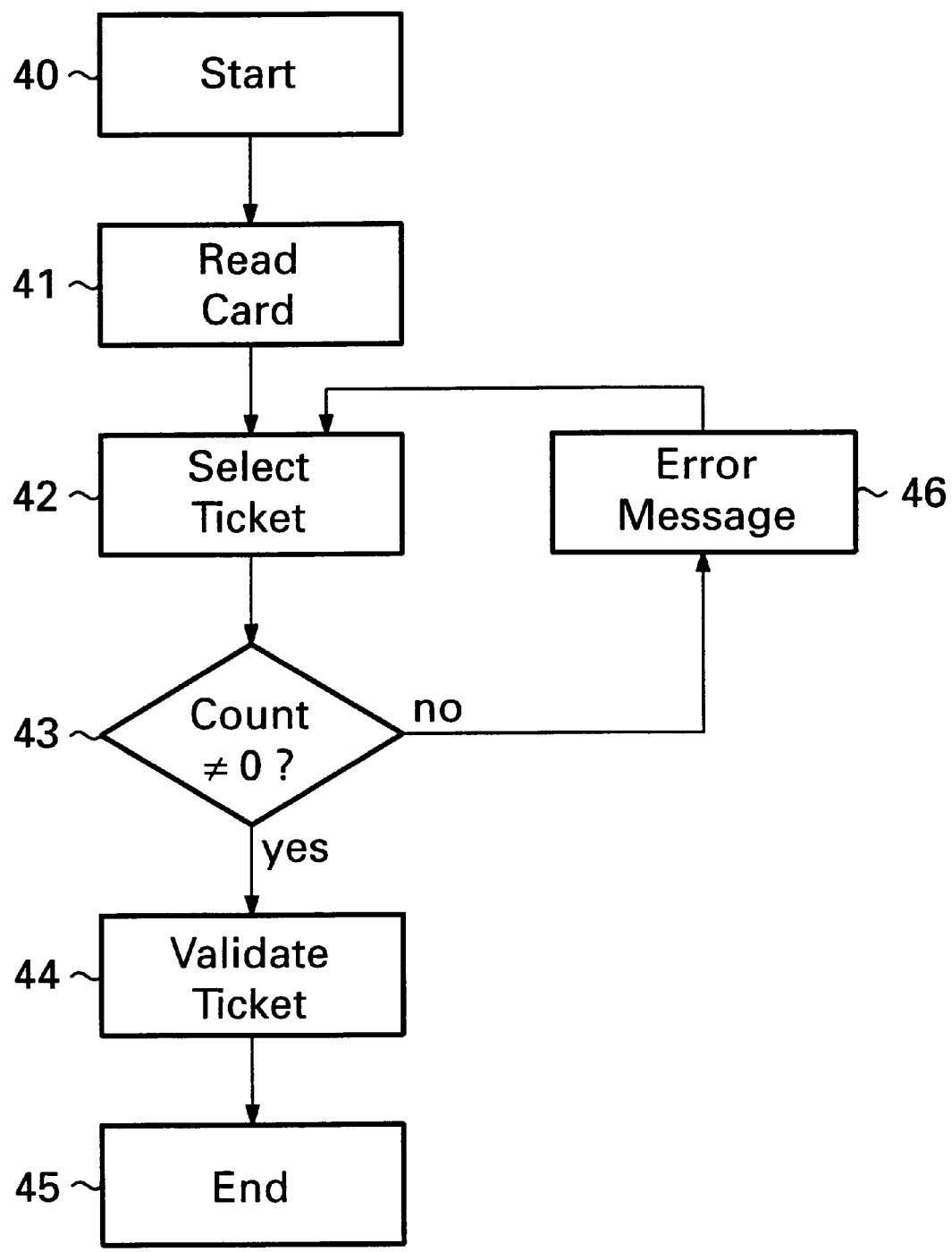
FIG. 4 shows a flow diagram representing the method of the present invention, FIG. 5 schematically shows a terminal in which the method of the present invention may be utilized.

In the flow diagram of FIG. 4, an example of the validation of a ticket according to the present invention is represented. It will be assumed that the null value equals zero.

In step 40, the validation process is started, e.g. by inserting the smart card in question in a validation terminal.

In step 41, the terminal checks the card for the presence of tickets. Data identifying the tickets are transferred to the terminal.

In step 42, the terminal presents the tickets to the user, e.g. by displaying a list of tickets on a screen. The contents of the validation fields 22 are also shown. The user selects the ticket to be validated, e.g. by typing in the number of the ticket in the list.

In step 43, the security module (SM) of the terminal checks the validation count (stored in the validation count field 26) of the selected ticket. A count value greater than zero indicates that the ticket may be validated again, in which case the procedure continues with step 44. If the count value equals zero (the predetermined null value), the procedure continues with step 46.

In step 44, new validation data are written in the validation field 22 of the selected ticket. Old validation data may be overwritten. Preferably, before the writing of new data a check of the old validation data takes place, ensuring that the old data pertain to an expired or otherwise unwanted ticket. If the validation fails, an error message may be generated and the procedure may be terminated.

In step 45, the procedure is concluded by displaying the result ("ticket validated") to the user. The card may be removed from the terminal, or the procedure may return to step 42.

In case the procedure continues with step 46 after step 43, an error message is displayed on the screen of the terminal and the procedure returns to step 42, allowing the user the select another ticket.

It will be understood that in the case of so-called contactless cards, the insertion of the card into the terminal may be omitted.

The procedure may further comprise a check for expired tickets. Such tickets may be invalidated by setting the validation count to the null value (e.g. zero).

The price and the sequence number, as stored in the price field 24 and the sequence number field 25, may be used to limit the number of tickets issued and thus to limit the extent of possible fraud. The issuing terminal may e.g. cumulatively store the prices of the tickets and compare the thus produced sum of the prices with a predetermined maximum value. Also, the sequence number of the ticket to be issued may be compared by the issuing terminal with a predetermined maximum value. In both cases, the issue of the ticket may be prevented if the maximum value (i.e. the issue limit) has been reached. This will further be explained below with reference to FIG. 7.

While the price and the sequence number may be used to limit the number of tickets issued, the validation count as discussed above may be used for limiting the number of tickets to be validated. The count value written into the card upon issuance of the ticket may also be registered in the issuing terminal. The sum of the registered count values may be limited to a predetermined number, the limit value, which may be different for each terminal. Said limit value may be valid for a period of time, e.g. a day or a week, allowing the terminal to issue a maximum number of ticket in one day or week.

Issuing a ticket of the type shown in FIG. 3 comprises the following steps:

a. providing payment data, b. checking issuing limits, c. creating a ticket (20) in the memory of the smart card, the ticket comprising various fields (21–26), d. writing entitlement data in the entitlement field (21), e. writing a validation count in the validation count field (26), and optionally:

f. writing price data in the price field (24), g. writing a sequence number in the sequence number field (25).

In step a, the terminal is provided with payment data guaranteeing the payment of the ticket. These payment data may be the result of a deduction of a monetary balance in the smart card, or may consist of e.g. an electronic cheque or cash money.

In step b, the issuing limits are checked, i.e. it is verified by means of a terminal validation count and whether the maximum number of tickets has already been issued. If this is the case, the procedure is terminated. Possibly a ticket may be issued having a lower value of the validation count than asked for by the user. This may result in a partial refund.

In step c, the fields of the ticket are preferably given an initial value representing invalidity, e.g. zero. This ensures that no valid ticket can be issued when the procedure is prematurely terminated.

In step d, the data entitling the user to a certain service, access etc. are written into the ticket. These entitlement data specify the ticket.

In step e, the validation count is set to a value corresponding with the received payment data.

In step g, the sequence number may be written in the ticket. Substantially simultaneously a sequence number count is increased in the terminal in order to register the number of tickets issued. As the validation count, the sequence number count may be used to limit the number of tickets issued, e.g. per day or per week. This provides additional protection against fraud in case an issuing terminal is stolen or abused.

Figure 5:
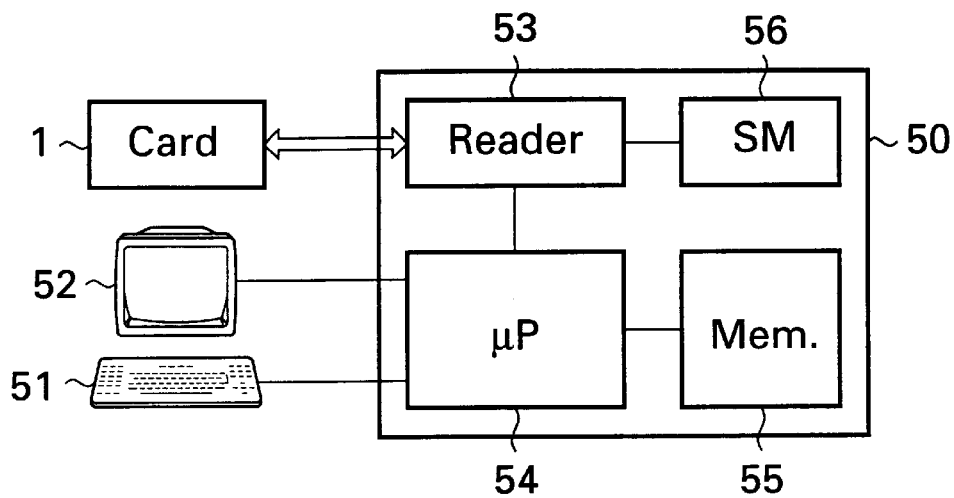

In FIG. 5 a terminal for use with the smart card and method of the present invention is schematically shown. The terminal 50 comprises a keyboard 51, a display screen 52 and a card reader 53, in which a card 1 may be inserted in order to exchange data. The terminal further comprises a processor 54 for processing data under the control of suitable programs, a memory 55 for storing data and programs, and a security module 56 for protectedly storing usage data of the terminal, such as monetary balances. In the security module 56, or alternatively in the memory 55, the terminal validation count and sequence number count, which may be used to limit the number of issued or validated tickets, are also stored. Additionally, a validation count limit and a sequence number limit, with which the terminal validation count and the sequence number count may be compared, are stored in the security module 56 or the memory 55. The terminal 50 may be used as an issuing and/or as a validating terminal.

Figure 6:
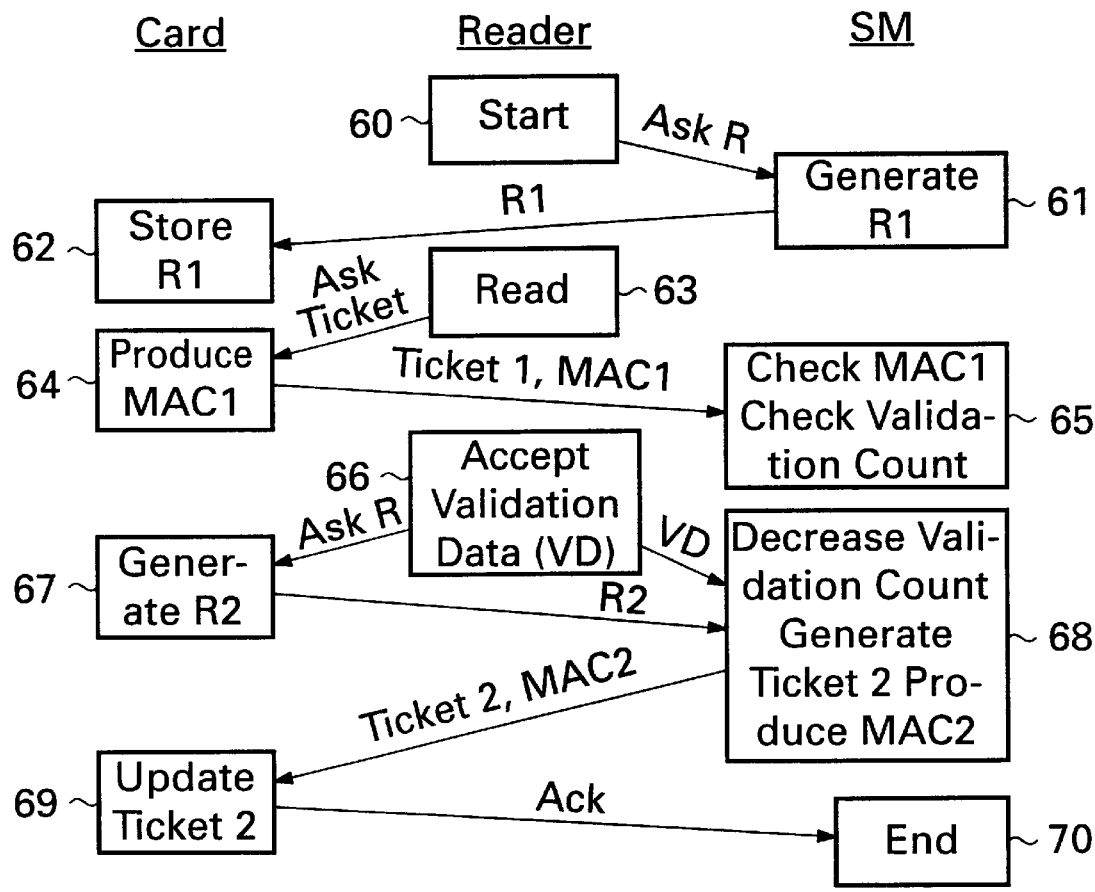
FIG. 6 shows a diagram representing the exchange of data between a card, a card reader and a security module, and FIG. 7 schematically shows a security module of a terminal in which issue limits are kept.

FIG. 6 schematically shows the exchange of data between a smart card and a terminal during the validation of a ticket, the terminal comprising a smart card reader/writer (denoted as reader) and a security module (SM).

In step 60, the procedure is started by the reader issuing a request to the security module. This request may be initiated by the user of the card, who activated the terminal by e.g. inserting the card into the terminal, pressing a button, or sending a signal to the terminal (e.g. by means of infra-red light).

In step 61, the security module generates and stores a first random number R1 in response to said request. This number, which serves prevent replay of the data exchange, is sent to the card. In step 62, the card stores the number R1.

In step 63, the terminal sends, via the reader, a read command to the card in order to read a ticket. This read command may or may not specify a particular ticket. In response to the read command, the card produces in step 64 a first message authentication code MAC1. This code may be calculated by means of a cryptographic function having the ticket data and the random number R1 as input parameters. Such functions are well known in the art. The resulting code MAC1 may be appended to the ticket, whereupon the ticket (denoted as Ticket1) and the code MAC1 are sent to the security module, via the reader.

In step 65, both the code MAC1 and the validation count of the received ticket are checked. The check of the code MAC1 may be effected by recalculating the code, using the random number R1 stored in the security module. The validation count may be checked by comparing the contents of the validation count field (26 in FIG. 3) of the ticket with a predetermined null value (e.g. zero). If the validation count equals the null value, or if the message authentication code is incorrect, the procedure may either terminate or return to step 60.

In step 66, the terminal accepts validation data (denoted as VD) from the user, e.g. by means of a keyboard, which data VD are passed to the security module. The reader then asks the card for a (new) random number. In response, the card generates in step 67 a second random number R2 and sends the number R2 to the (security module of the) terminal.

In step 68, the security module performs three actions: the validation count is decreased, the validated ticket (Ticket2) is produced and a new message authentication code (MAC2) is produced. That is, the validation count of the ticket is decreased, validation data are written into the validation field (22 in FIG. 3) and a new code MAC2 is calculated using a function having the validated ticket (Ticket2) and the second random number (R2) as input parameters. The validated ticket (Ticket2) and the new code (MAC2) are sent to the card.

It should be noted that the validation count of a register in the security module (e.g. register R5 in FIG. 7) may be increased in step 68 in order to keep track of the number of tickets validated by the terminal.

It should further be noted that step 68 preferably comprises inseparable actions in that the step 68 cannot be interrupted. This further enhances the security of the process.

In step 69, the card checks the code MAC2, e.g. by recalculating the code using the ticket and the stored random number R2. If the code MAC2 is found to be incorrect, the procedure may terminate or may return to step 66. If the code is correct, the validated ticket is stored in the card, e.g. by overwriting the exiting ticket (Ticket1). The card then acknowledges the succesful updating of the ticket. Subsequently, the procedure is ended in step 70.

Figure 7:
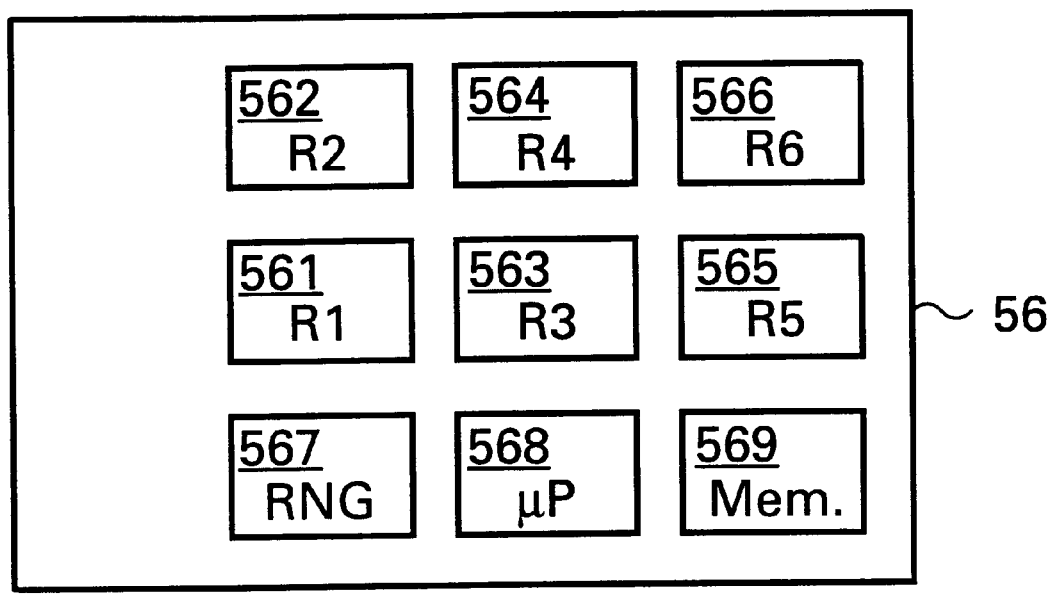

FIG. 7 schematically shows a security module 56 of a tickets issuing terminal, e.g. the terminal 50 of FIG. 5. The security module 56 is arranged for keeping issue limits. The security module 56 comprises register units 561–566, a random number generator (RNG) 567, a microprocessor ($\mu$P) 568 and a memory (Mem.) 569. The register units 561–565, the random number generator 567 and the memory 569 are connected with the microprocessor 568 by control and data lines which are not shown for the sake of clarity.

Register unit 561 comprises a first register (R1) arranged for storing the sum of all tickets, i.e. the so-called ticket float. Register unit 562 comprises a second register (R2) for storing a maximum value of the said sum. By comparing the contents of R1 and R2, it can be ascertained that the sum of all tickets (stored in R1) never exceeds the maximum sum (stored in R2).

Similarly, register unit 563 comprises a third register (R3) arranged for storing the current sequence number, i.e. the sequence number of the ticket last issued. Register unit 564 comprises a fourth register (R4) arranged for storing the maximum sequence number. Again, before a ticket is issued it may be verified whether the current sequence number (in R3) does not exceed the maximum sequence number (in R4), thus limiting the number of tickets issued.

Optional register units 565 and 566 may be use to store the sum of the validation counts: register 565 comprises a fifth register (R5) storing the sum of the validation counts of the tickets validated by the terminal, while register 566 comprises a sixth register (R6) storing the maximum sum of the validation counts.

Register units 561, 563 and 565 thus store current values, while register units 562, 564 and 566 store maximum values. The said maximum values are preferably predetermined, i.e. fixedly stored in the security module, but may also be updated periodically. The use of the registers R1 through R4 allows an efficient limitation on the number of tickets to be issued, as well as on the total value of those tickets. The use of the registers R5 and R6 allows an efficient limitation of the total number of validated tickets. The extent of possible fraud may thus be limited.

It will be understood that the registers R1–R6 may also be embodied as locations of a memory, e.g. the memory 569, instead of separate register units 561–565 as shown in FIG. 7. Also, in terminals which only issue tickets the registers R5 and R6 may be omitted. Similarly, in terminals which only validate tickets the registers R1 through R4 may be omitted.

As explained above, the use of multiple tickets according to the present invention allows an efficient and flexible use of the memory space of a smart card.

It will be understood by those skilled in the art that the embodiments described above are given by way of example only and that many modifications and additions are possible without departing from the scope of the present invention.

I claim:

1. A smart card comprising:
   an integrated circuit having a processor and a memory configured to store at least one ticket, wherein the at least one ticket stored in the memory comprises:
   an entitlement field configured to store data relating to an entitlement of the at least one ticket;
   a validation field configured to store data relating to a validity of the at least one ticket; and
   a validation count field configured to store a validation count representing a number of times the at least one ticket may be validated, and
   wherein the memory is a rewriteable memory.

2. A smart card according to claim 1, wherein the validation count is decreased upon each validation of the at least one ticket, and a further validation of the at least one ticket is blocked when the validation count has a predetermined value.

3. A smart card according to claim 2, wherein the predetermined value equals zero.

4. A smart card according to claim 1, wherein the at least one ticket stored in the memory further comprises a price field configured to store at least one of 1) a price of the at least one ticket and 2) a price of a single use of the at least one ticket.

5. A smart card according to claim 1, wherein the at least one ticket stored in the memory further comprises a sequence number field configured to store a sequence number given to the at least one ticket by an issuing terminal.

6. A smart card according to claim 1, wherein the at least one ticket stored in the memory further comprises at least one verification field configured to store data relating to a check of the validity of the at least one ticket.

7. A method of registering tickets on a smart card including a memory, the method comprising the steps of:
   creating a ticket in the memory, the ticket comprising at least one field;
   issuing the ticket by storing in the at least one field data identifying a right to be conveyed by the ticket, and storing in a validation count field a validation count representing a number of times the ticket may be validated;
   validating the ticket by storing in a validation field data relating to a validity of the ticket; and
   adjusting the validation count stored in the validation count field,
   wherein the step of validating the ticket is inhibited if the validation count has a predetermined value, and
   wherein the memory is a rewriteable memory.

8. A method according to claim 7, wherein the predetermined value equals zero, and the adjusting step decreases the validation count.

9. A method according to claim 7, wherein the step of issuing the ticket further comprises:
   storing a sequence number in a sequence number field, the sequence number being registered in an issuing terminal.

10. A method according to claim 9, wherein the sequence number is registered in a security module of the issuing terminal.

11. A method according to claim 7, wherein the step of issuing the ticket further comprises:
    storing at least one of a price of the ticket and a price of a single use of the ticket in a price field.

12. A method according to claim 7, wherein the step of issuing the ticket further comprises:
    adding a price of each issued ticket to a sum stored in the issuing terminal.

13. A method according to claim 12, wherein the adding step adds the price of each issued ticket to a sum stored in a security module of the issuing terminal.

14. A method according to claim 7, further comprising the step of verifying the ticket by storing data relating to a check of a validity of the ticket in at least one verification field.

* * * * *